United States Patent [19]

Stansfield et al.

[11] 3,996,059
[45] Dec. 7, 1976

[54] DISPERSING AGENTS

[75] Inventors: James Frederick Stansfield; Arthur Topham, both of Manchester, England

[73] Assignee: Imperial Chemical Industries Limited, London, England

[22] Filed: Dec. 26, 1974

[21] Appl. No.: 536,479

Related U.S. Application Data

[63] Continuation-in-part of Ser. No. 313,632, Dec. 11, 1972, abandoned.

[30] Foreign Application Priority Data

Dec. 30, 1971 . United Kingdom ............ 60731/71
Dec. 13, 1974 United Kingdom ............ 53946/74

[52] U.S. Cl. .................... 106/308 N; 106/308 Q; 106/300; 106/304; 106/307; 106/302; 106/296; 106/301; 106/305; 8/85 R
[51] Int. Cl.² ................. C09C 3/00; C09D 17/00
[58] Field of Search .................. 106/308 N, 308 Q; 260/404.5; 252/357, 356

[56] References Cited
UNITED STATES PATENTS

| | | | |
|---|---|---|---|
| 2,589,674 | 3/1952 | Cook | 106/308 N |
| 3,133,893 | 5/1964 | Newman | 260/42.14 |
| 3,506,466 | 4/1970 | Bramekamp | 106/308 N |
| 3,523,811 | 8/1970 | Cramer | 106/308 N |
| 3,778,287 | 12/1973 | Slarsfield et al. | 106/308 Q |

*Primary Examiner*—Patrick P. Garvin
*Assistant Examiner*—J. V. Howard
*Attorney, Agent, or Firm*—Cushman, Darby & Cushman

[57] ABSTRACT

A dispersing agent of the formula:

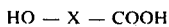

Y.CO.ZR wherein Z is a divalent bridging group which is attached to the carbonyl group through an oxygen or nitrogen atom, R is a primary, secondary or tertiary amino group or a salt thereof with an acid, or a quaternary ammonium salt group, and Y is the residue of a polyester chain which together with the —CO— group is derived from a hydroxycarboxylic acid of the formula:

HO — X — COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups, a process for the manufacture of the said agent and its use in the preparation of finely divided dispersions of solids in organic liquids.

5 Claims, No Drawings

DISPERSING AGENTS

This application is a continuation-in-part of our application Ser. No. 313,632 which was filed in the U.S. Patent Office on 11th Dec., 1972, now abandoned.

This invention relates to dispersing agents valuable for the preparation of dispersions of solids, particularly pigments, in organic liquids.

According to the invention there are provided the dispersing agents of the formula

Y.CO.ZR wherein Z is a divalent bridging group which is attached to the carbonyl group through an oxygen or nitrogen atom, R is a primary, secondary or tertiary amino group or a salt thereof with an acid, or a quaternary ammonium salt group, and Y is the residue of a polyester chain which together with the —CO— group is derived from a hydroxycarboxylic acid of the formula:

HO — X — COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

The residue of the polyester chain Y can be more specifically represented by the formula H $+$ O — X — CO $\frac{}{y-1}$ O—X — or

T — CO $+$ O — X — CO $\frac{}{y-1}$ O—X— wherein X has the meaning defined hereinbefore, T is a monovalent saturated or unsaturated aliphatic radical with at least 8 carbon atoms and y is a positive number from 2 to 20. The polyesters themselves have the formula H $+$ O — X — CO $\frac{}{y}$OH T — CO $+$ O — X — CO $\frac{}{y-1}$OH The divalent bridging group represented by Z is preferably of the formula

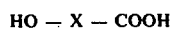

wherein $T^1$ is a hydrogen or an alkyl radical and A is an alkylene or hydroxyalkylene radical containing from 2 to 6 carbon atoms.

As examples of the radicals represented by $T^1$ there may be mentioned methyl, ethyl, n-propyl, n-butyl and octadecyl. As examples of the radicals represented by A there may be mentioned ethylene, trimethylene, tetramethylene, hexamethylene and β-hydroxytrimethylene.

The primary, secondary and tertiary amino groups represented by R are preferably of the formula

wherein $T^2$ and $T^3$ are each independently hydrogen, alkyl, substituted alkyl or cycloalkyl. The salts of the said amino groups are salts with coloured or colourless acids.

The quaternary ammonium groups represented by R are preferably of the formula:

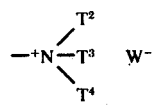

wherein $T^4$ has the same values as $T^2$ and can be the same or different, and $W^-$ is a colourless or coloured anion.

As examples of the radicals represented by $T^2$, $T^3$ and $T^4$ there may be mentioned alkyl such as methyl, ethyl, n-propyl, n-butyl and octadecyl, hydroxy lower alkyl such as β-hydroxyethyl, and cyclohexyl.

Throughout this specification the term "lower alkyl" is used to denote alkyl radicals containing from 1 to 4 carbon atoms.

The acids used to form salts with the amino groups or which contain the anion $W^-$ can be any inorganic acid or colourless or coloured organic acid, such as hydrochloric acid, sulphuric acid, acetic acid, propionic acid, formic acid, methane sulphonic acid, benzene sulphonic acid, benzoic acid or an organic dyestuff containing at least one sulphonic acid or carboxylic acid group, in particular azo, anthraquinone or phthalocyanine dyestuffs containing at least one sulphonic or carboxylic acid group such as are described in for example the third edition of the Colour Index which was published in 1971.

According to a further feature of the invention there is provided a process for the manufacture of the dispersing agents as hereinbefore defined where R represents a primary, secondary or tertiary amino group and Z is attached to the carbonyl group through a nitrogen atom which comprises condensing together a polyester of the formula Y.COOH and a compound of the formula $R^4AR^5$ wherein A has the meaning stated above, $R^4$ is

wherein $T^1$ has the meaning given above and $R^5$ is a primary, secondary or tertiary amino group.

This process of the invention can be conveniently carried out by stirring the reactants together, preferably at a temperature between 50° and 250° C, the reaction preferably being carried out in an inert atmosphere. If desired the reaction can be carried out in an inert organic liquid which is subsequently removed, for example by distillation, at the end of the reaction.

As examples of compounds of the formula $R^4AR^5$ which can be used in this process there may be mentioned 3-dimethylaminopropylamine and 3-octadecylaminopropylamine. When the said compounds contain two groups (as in 3-octadecylaminopropylamine) which can both react with the polyester then the resulting product is probably a mixture of two condensates, but such mixtures are also within the scope of the invention.

The said polyesters used in this process of the invention can be example be obtained by heating the hydroxycarboxylic acid of the formula HO-X-COOH or a mixture of such acids or a mixture of the hydroxycarboxylic acid and a carboxylic acid, optionally in the presence of an esterification catalyst, preferably at a temperature in the region of 160° to 200° C, until the required molecular weight has been obtained. The course of the esterification can be followed by measuring the acid value of the product, the preferred polyesters having acid values in the range of 10 to 100 mgms KOH/gm and especially in the range 20 to 100 mgms KOH/gm.

The water-formed in the esterification reaction is removed from the reaction medium, and this can be conveniently done by passing a stream of nitrogen over the reaction mixture, or preferably, by carrying out the reaction in the presence of a solvent, such as toluene or xylene, and distilling off the water as it is formed. The resulting polyesters can be isolated in the conventional manner.

In the said hydroxycarboxylic acids the radical represented by X preferably contains from 12 to 20 carbon atoms, and it is further preferred that there are between 8 and 14 carbon atoms between the carboxylic acid and hydroxy groups. It is also preferred that the hydroxy group is a secondary hydroxy group.

As specific examples of such hydroxycarboxylic acids there may be mentioned ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains in addition to 12-hydroxystearic acid minor amounts of stearic acid and palmitic acid.

The carboxylic acids which can be used in conjunction with the hydroxycarboxylic acids to obtain the polyesters are preferably saturated or unsaturated aliphatic carboxylic acids, particularly alkyl and alkenyl carboxylic acids containing a chain of from 8 to 20 carbon atoms. As examples of such acids there may be mentioned lauric acid, palmitic acid, stearic acid and oleic acid.

According to a further feature of the invention there is provided a process for the manufacture of the dispersing agents as hereinbefore defined wherein R represents a primary, secondary or tertiary amino group and Z is attached to the carbonyl group through an oxygen atom which comprises reacting an acid chloride of the polyester of the formula Y.COOH with a salt of an amine of the formula HOAR$^5$ with a strong acid wherein Y, A and R$^5$ have the meanings stated.

This process of the invention can be conveniently carried out by heating the acid chloride and the said salt together, optionally in the presence of a catalyst such as p-toluene sulphonic acid and isolating the resulting salt of the ester. If desired this salt can be converted to the free base by treatment with a base such as sodium hydroxide.

The said acid chloride can conveniently be obtained by the action of thionyl chloride on the acid Y.COOH. As examples of the said salts there may be mentioned the hydrochlorides of β-aminoethanol, β-methylaminoethanol and β-(dimethylamino)ethanol.

According to a further feature of the invention there is provided an alternative process for the manufacture of the dispersing agents of the invention having the formula YCO.OCH$_2$CHOHCH$_2$R$^5$, which comprises reacting a polyester of the formula Y.COOH with epichlorohydrin or epibromohydrin and subsequently treating with an amine of the formula HR$^5$, wherein Y and R$^5$ have the meanings stated.

This process of the invention can be conveniently carried out by heating the said polyester and the epichlorohydrin or epibromohydrin together, preferably in the presence of a tertiary amine as catalyst, adding the amine of the formula HR$^5$ and again heating to complete the reaction.

As examples of the said amines there may be mentioned ammonia, methylamine, diethylamine and octadecylamine.

The preferred polyester for use in the above processes is poly(hydroxystearic acid).

According to a further feature of the invention there is provided a process for the manufacture of the dispersing agents as hereinbefore defined wherein R is a tertiary amino group or a salt thereof with an acid or a quaternary ammonium salt group which comprises reacting together a hydroxy acid of the formula HO—X—COOH, wherein X has the meaning hereinbefore defined, and an amine of the formula HZR$^6$ wherein Z has the meaning hereinbefore defined and R$^6$ is a tertiary amino group or salt thereof with an acid or a quaternary ammonium salt group.

The process may be conveniently carried out by stirring the reactants together at a temperature between 150° C and 250° C optionally in the presence of a catalyst such as tetrabutyl titanate. If desired the reaction can be carried out in the presence of an organic liquid which may be subsequently removed, for example by distillation, at the end of the reaction.

The dispersing agents of the invention where R is a primary, secondary or tertiary amino group can be converted into the corresponding salts by stirring or milling together the said dispersing agents with a colourless or coloured acid or a salt thereof with a weaker base (e.g. an aromatic amine such as p-dodecylaniline) or with a metal (e.g. aluminium) which forms only a weakly basic hydroxide, in an inert organic liquid, the reaction being carried out if desired at a temperature up to the boiling point of the organic liquid. If desired the reaction mixture can contain a small amount of water, as, in some cases, this acts as a catalyst for the reaction. The resulting amine salts can then be isolated by conventional methods, but, if desired, the resulting solution of the salt can be used directly in the production of dispersions of solids in organic liquids.

The dispersing agents of the invention wherein R is a quaternary ammonium group can themselves be obtained by treating the corresponding dispersing agents wherein R is a primary, secondary or tertiary amino group with a quaternising agent, such as dimethyl sulphate, the reaction being preferably carried out at elevated temperatures, for example between 50° and 250° C, and optionally in the presence of an organic liquid.

The dispersing agents of the invention are of value in preparing dispersions of solids, in particular pigments, in organic liquids, and such dispersions form a further feature of the invention.

According to a further feature of the invention there are provided dispersions of solids in organic liquids which contain dissolved therein a dispersing agent as hereinbefore defined.

The said dispersions can be obtained by any of the conventional and well known methods of preparing dispersions. Thus the solid, the organic liquid and the dispersing agent may be mixed in any order and the mixture then subjected to a mechanical treatment to reduce the particle size of the solid, for example by ball milling, bead milling or gravel milling until the dispersion is formed. The treatment is continued until the particle size of the solid is less than 25 microns and preferably less than 10 microns.

When the said dispersing agents are used in the form of these salts, then it is not essential to use the preformed salt, since this can be prepared in situ at the same time as making the dispersion by mixing together the solid, the organic liquid, the appropriate dispersing agent containing a primary, secondary or tertiary amino group, and acid, and subjecting the mixture to a mechanical treatment. It is not essential that all the amino group or groups be converted into salt form, since it has been found that mixtures of the free bases and the salts are equally effective dispersing agents.

Alternatively, the solid can be treated to reduce its particle size independently or in admixture with either the organic liquid or the dispersing agent, and the other ingredient or ingredients then added following which dispersion can be obtained by stirring the mixture. As a further alternative an organic liquid solution of the dispersing agent can be emulsified into an aqueous phase by known means, such as high speed stirring, in the presence of one or more surface active agents, and the resulting emulsion added to an aqueous slurry of the solid, after which the organic liquid and the water are removed by filtration and drying of the residue of solid and dispersing agent. This residue can be subsequently dispersed in an organic medium. Compositions obtained in this way and comprising the solid in finely divided form and the dispersing agent are a further feature of the invention.

It is preferred that the amount of dispersing agent present in the dispersions is such as corresponds to between 5 and 50% by weight, and preferably between 10 and 30%, based on the weight of the solid, and the dispersions preferably contain from 5 to 70% by weight of the solid based on the total weight of the dispersion.

The organic liquids used to prepare the said dispersions can be any inert organic liquids in which the said dispersing agents are at least partly soluble at ambient temperatures and which are stable under the subsequent conditions of usage of the dispersion. If desired mixtures of organic liquids can be used. Preferred organic liquids are hydrocarbons and halogenated hydrocarbons such as benzene, toluene, xylene, white spirit, n-hexane, cyclohexane, chlorobenzene, carbon tetrachloride, and perchloroethylene. Other organic liquids can however be used, for example esters such as alkyd resins and heat bodied linseed oils used as lithographic varnish media. Above all it is preferred that the organic liquid is a predominantly aliphatic petroleum fraction. In general, the organic liquids or mixtures thereof used to prepare the dispersions will depend on the subsequent uses to which the dispersions are to be put.

The solids are preferably inorganic or organic pigments, and can be of any of the recognised classes of pigments. As examples of inorganic pigments there may be mentioned titanium dioxide, carbon black, zinc oxide, Prussian Blue, cadmium sulphide, iron oxides, vermillion, ultramarine and chrome pigments including chromates of lead, zinc, barium and calcium and the various mixtures and modifications thereof such as are commercially available as greenish-yellow to red pigments under the names primrose, lemon, middle, orange, scarlet and red chromes.

As examples of organic pigments there may be mentioned pigments of the azo, thioindigo, anthraquinone, anthanthrone, isodibenzanthrone or triphendioxazine series, vat dye pigments, phthalocyanine pigments such as copper phthalocyanine and its nuclear halogenated derivatives and copper tetraphenyl and octaphenyl phthalocyanines, quinacridone pigments and lakes of acid, basic and mordant dyestuffs. Such pigments are described in, for example, the 2nd Edition of the Colour Index which was published in 1956 under the heading "Pigments" and in subsequent authorised amendments thereto. Preferred pigments are carbon black and especially copper phthalocyanine and its nuclear halogenated derivatives.

The dispersions of the invention are fluid or semi-fluid compositions containing the solid in finely divided and deflocculated form, and can be used for any purpose for which dispersions of these particular solids are conveniently used. Thus pigment dispersions are of particular value in the manufacture of printing inks, by incorporating the dispersions with the other components conventionally used in the manufacture of such inks. The dispersions are also of value in the manufacture of paints, for which purpose the dispersions are incorporated into conventional alkyd or other resins. Alternatively, the dispersing agents of the invention can be used as dispersing agents in the production of dispersions of other dyestuffs, for example Acid Dyestuffs, Disperse Dyestuffs and Basic Dyestuffs, such as are described in the 2nd Edition of the Colour Index, in organic liquids; such dispersions being used for the solvent dyeing of textiles.

The invention is illustrated but not limited by the following Examples in which the parts and percentages are by weight.

A polyester was prepared as follows:

POLYESTER A

A mixture of 348 parts of xylene and 3350 parts of a commercial grade of 12-hydroxystearic acid (having acid and hydroxyl values of 182 mg.KOH/gm. and 160 mg.KOH/gm. respectively) is stirred for 22 hours at 190° to 200° C, the water formed in the reaction being separated from the xylene in the distillate which is then returned to the reaction medium. After 152 parts of water have been collected, the xylene is removed by heating at 200° C in a stream of nitrogen. The resulting pale amber coloured liquid has an acid value of 35.0 mgms./KOH/gm., KOH/gm., indicating that the value of $y$ is 6.

EXAMPLE 1

A mixture of 1600 parts of polyester A and 102 parts of 3-dimethylaminopropylamine is stirred for 2½ hours at 160° C under a reflux condenser and in a current of nitrogen. 10 Parts by volume of the mixture are then distilled off, the temperature is raised to 190° C during 20 minutes, and maintained at 190° C to 200° C for 2 hours 45 minutes. The resulting pale amber coloured viscous liquid partially solidifies on cooling.

Infra-red analysis of the product shows bands at 1655 and 1540 $cm^{-1}$ corresponding to the presence of a -CONH- group. Titration of the product with perchloric acid, with or without formaldehyde, shows the presence of 0.557 equivalent of a tertiary amino group per 1000 grams of product, indicating that the value of $y$ is 6. The acid value of the product is 12.3 mgms. KOH/gram.

EXAMPLE 2

13.5 parts of dimethyl sulphate are added to 183 parts of the product of Example 1 at 44° C, the temperature of the mixture rising to 72° C. The mixture is then stirred for 1½ hours at 90° C to 100° C. The product is a pale amber coloured viscous liquid which forms a gum on cooling.

Infra red analysis of the product shows bands at 750, 1015, 1062 and 1240 cm$^{-1}$ due to the presence of the $CH_3SO_4^-$ anion, and bands at 1545 and 1660 cm$^{-1}$ due to the CONH group.

EXAMPLE 3

A mixture of 900 parts of Polyester A and 300 parts of a commercial grade of 3-octadecylaminopropylamine is stirred for 5½ hours at 160° to 165° C in an inert atmosphere. The mixture is then cooled, giving a pale amber coloured solid consisting essentially of a mixture of compounds of the formula

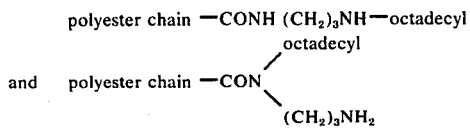

Infra red analysis shows the presence of bands at 3310, 1645 and 1550 cm$^{-1}$ corresponding to the CONH group. Titration with perchloric acid in acetic acid shows that the product contains 1 equivalent of an amino or substituted amino group in 1455 grams. The acid value of the product is 5.7 mgms KOH/gm.

EXAMPLE 4

A mixture of 160 parts of Polyester A, 0.39 part of dodecyldimethylamine and 9.2 parts of epichlorohydrin is stirred for 3 hours at 150° to 155° C, by which time the acid value of the product has fallen to 4.05 mgms KOH/gm.

A mixture of 50 parts of the above product and 2.17 parts of diethylamine is stirred for 19 hours at 100° C. Titration of the resulting product with perchloric acid shows that 78.5% of the diethylamine has reacted with the chloromethyl group to give a product consisting essentially of

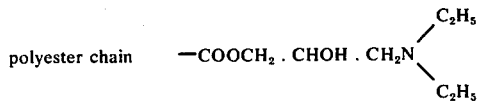

EXAMPLE 5

A mixture of 3 parts of lead sulphochromate, 0.2 parts of copper phthalocyanine disulphonic acid, 1.3 parts of the product of Example 1 and 5.5 parts of a petroleum fraction boiling at 100° to 120° C is ball milled for 16 hours to give a fluid, finely divided and well deflocculated dispersion of the pigment which is suitable for use in paint or in a gravure printing ink. Similar dispersions are obtained when the above pigment is replaced by any of the following:
 a. copper polychlorophthalocyanine
 b. Tioxide RCR, which is a coated form of rutile titanium dioxide
 c. The phosphomolybdotungstate of C.I. Basic Blue 7 (C.I. 42595)
 d. 4:10-Dibromoanthranthrone
 e. Indanthrone

EXAMPLE 6

A mixture of 3 parts of copper polychlorophthalocyanine, 1.3 parts of the product of Example 1, 0.2 part of 1-naphthylamine-5-sulphonic acid and 5.5 parts of a petroleum fraction boiling at 100° to 120° C is ball milled for 16 hours to give a fluid, finely divided and well deflocculated dispersion of the pigment. Similar dispersions are obtained when the 0.2 part of 1-naphthylamine-5-sulphonic acid is replaced by 0.2 part of the following:
 a. commercially available mixture of 1-naphthylamine-6- and 7-sulphonic acids
 b. sulphanilic acid
 c. N-benzylsulphanilic acid
 d. 2-naphthylamine-6-sulphonic acid
 e. metanilic acid
 f. p-toluenesulphonic acid
 g. naphthalene-2-sulphonic acid

EXAMPLE 7

A mixture of 3 parts of a rosinated calcium toner of 1-(2'-sulpho-4'-methylphenylazo)-2naphthol-3-carboxylic acid, 1.5 parts of the product of Example 1 and 5.5 parts of a petroleum fraction boiling at 100° to 120° C is ball milled for 16 hours to give a fluid, finely divided and well deflocculated dispersion of the pigment.

Similar dispersions are obtained when the above pigment is replaced by the barium toner of 1-(2'-sulpho-4'-methyl-5'-chlorophenylazo)-2-naphtol-3-carboxylic acid or the product of Example 1 is replaced by the product of Examples 3 or 4.

EXAMPLE 8

A mixture of 3 parts of β-form copper phthalocyanine, 0.2 parts of copper phthalocyanine trisulphonic acid, 1.3 parts of the product of Example 1 and 5.5 parts of a petroleum fraction boiling at 100° to 120° C is ball milled for 16 hours to give a fluid, finely divided and well deflocculated dispersion of the pigment which is suitable for use in paint media where there is little or no tendency for the pigment to flocculate.

EXAMPLE 9

A mixture of 0.2 part of copper phthalocyanine disulphonic acid, 1.3 parts of the product of Example 1 and 5.5 parts of a petroleum fraction boiling at 100° to 120° C is ball milled for 16 hours when a clear blue solution is obtained. 3 Parts of β-form copper phthalocyanine are added and milling continued for 2 hours. A fluid, finely divided and well deflocculated dispersion of the pigment is obtained.

Similar results are obtained if the 0.2 part of the above disulphonic acid is replaced by 0.2 part of the condensation product of 1 mol of phosgene and 2 mols of 4'-amino-4-hydroxy-3-methylazobenzene-5-carboxylic acid or by 0.2 part of the free acid form of C.I. Yellow R (C.I. 40000) and/or the 3 parts of the above pigment are replaced by 3 parts of the pigment obtained by coupling tetrazotised 3:3'-dichlorobenzidine with 2 mols of acetoacetanilide.

EXAMPLE 10

A mixture of 3 parts of copper polychlorophthalocyanine, 1.5 parts of the product of Example 2 and 5.5 parts of a petroleum fraction boiling at 100° to 120° C is ball milled for 16 hours to give a finely divided, well deflocculated dispersion of the pigment.

A similar dispersion is obtained when the above pigment is replaced by a rosinated calcium toner of 1-(2'-sulpho-4'-methylphenylazo)-2-naphthol-3-carboxylic acid.

EXAMPLE 11

A mixture of 0.39 part of the p-dodecylaniline salt of a copper phthalocyanine disulphonic acid, 1.11 parts of the product of Example 1 and 5.5 part of a petroleum fraction boiling at 100°–120° C is stirred for 30 minutes at 20° C. To the resulting blue solution are added 3 parts of β-form copper phthalocyanine and the mixture is ball milled for 16 hours to give a fluid, finely divided and well deflocculated dispersion of the pigment.

EXAMPLE 12

A mixture of 1600 parts of polyester A and 204 parts of 3-dimethylaminopropylamine is stirred for 30 minutes at 160° C under a reflux condenser and in a current of nitrogen. The temperature of the mixture is then raised to 190° C during 30 minutes, the water formed in the reaction being distilled off, and the temperature is then maintained at 190°–200° C for 2¾ hours. The resulting pale amber coloured viscous liquid sets to a wax on cooling.

The product has an equivalent by titration with perchloric acid of 1008, and the acid value is 4.0 mgms./KOH/gram.

EXAMPLE 13

A mixture of 0.32 part of an aluminium salt of a copper phthalocyanine trisulphonic acid containing 1.1% of aluminium, 1.18 parts of the product of Example 12, 5.5 parts of a petroleum fraction boiling at 100°–120° C and 0.03 part of water is stirred for 1 hour at 20° C. To the resulting blue solution is added 3 parts of β-form copper phthalocyanine and the mixture is ball milled for 16 hours to give a fluid, finely-divided and well deflocculated dispersion of the pigment.

The aluminium salt used in this Example was itself obtained by dissolving 50 parts of a commercially available sodium salt of the copper phthalocyanine trisulphonic acid in 2,000 parts of water at 100° C. adding 23.6 parts of a concentrated aqueous solution of hydrochloric acid, followed by a solution of 50 parts of aluminium sulphate in water, filtering off the precipitated solid, washing with water and drying the solid.

EXAMPLE 14

A mixture of 960 parts of 12-hydroxystearic acid, 163 parts of 3-dimethylaminopropylamine, 83 parts of toluene and 2 parts of tetrabutyl titanate is stirred and boiled under reflux for 13 hours at 180° C using a trap to collect 57 parts of water. On cooling, the resulting 94.5% solution forms a paste. Titration with hydrochloric acid shows it to contain one equivalent in 720 g. of 94.5% solution. The equivalent of the 100% condensate is 680 indicating that the value of $y$ is 2.

EXAMPLE 15

A mixture of 20 parts of the product of Example 15, 8.3 parts of copper phthalocyanine disulphonic acid, 5 parts of water and 61 parts of toluene is stirred and boiled under reflux for 2 hours, then a water trap is fitted and the water distilled out, leaving a 29% solution of the salt.

A mixture of 3.1 parts of this 29% solution, 3.9 parts of toluene and 3 parts of β-form copper phthalocyanine is ball milled for 16 hours to give a finely divided and well deflocculated dispersion of the pigment.

POLYESTER B

A mixture of 1200 parts of ricinoleic acid and 157 parts of xylene is stirred for 23 hours at 190 to 200° C under reflux, using a trap to remove water. The xylene is then removed under reduced pressure at 150° C. The resulting pale amber coloured liquid has an acid value of 23.9 mg.KOH/gm., indicating that the value of $y$ is 8.3.

EXAMPLE 16

A mixture of 243 parts of Polyester B and 10.6 parts of 3-dimethylaminopropylamine is stirred under nitrogen at 195° to 200° C for 4½ hours. A small quantity of water is distilled out. Titration with hydrochloric acid shows it to contain one equivalent in 2520 g.

A mixture of 0.6 part of this, 5.4 parts of a petroleum fraction boiling at 100° to 120° C and 4 parts of a rosinated calcium toner of 1-(2'-sulpho-4'-methylphenylazo)-2-naphthol-3-carboxylic acid is ball milled for 16 hours to give a finely divided, well deflocculated dispersion of the pigment.

EXAMPLE 17

A mixture of 1870 parts of 12-hydroxystearic acid, 121 parts of 2-diethylaminoethanol, 169 parts of toluene and 3.5 parts of tetrabutyl titanate is stirred for 14 hours at 180° C under reflux, using a trap to remove water. The product is a pale amber coloured 92.3% solution. Titration with hydrochloric acid shows it to contain one equivalent in 2160 g. of 92.3% solution. 246 Parts of this 92.3% solution is stirred whilst 13.5 parts of dimethyl sulphate is added. There is an exothermic reaction leading to the quaternary ammonium methosulphate.

A mixture of 0.6 part of this quaternary ammonium methosulphate, 5.6 parts of a petroleum fraction boiling at 100° to 120° C and 4 parts of a rosinated calcium toner of 1-(2'-sulpho-4'-methylphenylazo)-2-naphthol-3-carboxylic acid is ball milled for 16 hours to give a finely divided, well deflocculated dispersion of the pigment.

We claim:
1. A composition of matter consisting essentially of a finely divided dispersion of a solid pigment or dyestuff having a particle size of less than 25 microns in a liquid hydrocarbon or chlorinated hydrocarbon containing dissolved therein a dispersing agent of the formula

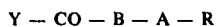

$$Y - CO - B - A - R$$

wherein B is selected from —NH—, —O—, and —NT$_1$—, wherein T$_1$ is alkyl containing up to 20 carbon atoms and A is alkylene or β-hydroxyalkylene containing from 2 to 6 carbon atoms, R is NT$_2$T$_3$ or NH$_2{}^+$T$_3$T$_4$W$^-$ wherein T$_2$, T$_3$ and T$_4$ are each independently H or alkyl containing up to 20 carbon atoms and W⁻ is the anion of an acid, and Y is the residue of a polyester chain containing between 2 and 10 monomeric units which together with the —CO— group is derived from a hydroxycarboxylic acid of the formula

HO — X — COOH wherein X is a divalent saturated or unsaturated aliphatic radical containing between 8 and 20 carbon atoms and in which there are at least 4 carbon atoms between the hydroxy and carboxylic acid groups or from a mixture of such a hydroxycarboxylic acid and a carboxylic acid which is free from hydroxy groups, said pigment or dyestuff being present in an amount of 5–70 percent by weight based on the total weight of the dispersion and said dispersing agent being present in an amount of 5–50 percent by weight based on the weight of said pigment or dyestuff.

2. A composition of matter according to claim 1 wherein W⁻ is the anion of an inorganic or an organic acid.

3. A composition of matter according to claim 1 wherein W⁻ is selected from Cl⁻, ESO₄⁻ or ECOO⁻ wherein E is H or lower alkyl, compounds of the benzene, naphthalene or anthracene series which contain at least one —COO— or —SO₃— group and dyestuffs of the azo, or phthalocyanine series which contain at least one —COO— or —SO₃— group.

4. A composition according to claim 1 wherein the solid pigment or dyestuff is an organic pigment.

5. A composition according to claim 4 wherein the organic pigment is a copper phthalocyanine or a nuclear halogenated derivative thereof.

* * * * *